(12) United States Patent
Lee et al.

(10) Patent No.: US 12,149,750 B2
(45) Date of Patent: Nov. 19, 2024

(54) IMAGE PROCESSING DEVICE AND METHOD FOR OPERATING IMAGE PROCESSING DEVICE

(71) Applicant: SAMSUNG ELECTRONICS CO., LTD., Suwon-si (KR)

(72) Inventors: Sang Heon Lee, Hwaseong-si (KR); Sung Ho Jun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/455,345

(22) Filed: Nov. 17, 2021

(65) Prior Publication Data
US 2022/0201340 A1    Jun. 23, 2022

(30) Foreign Application Priority Data
Dec. 23, 2020    (KR) .................. 10-2020-0181783

(51) Int. Cl.
*H04N 19/96* (2014.01)
*H04N 19/13* (2014.01)
*H04N 19/184* (2014.01)

(52) U.S. Cl.
CPC ............. *H04N 19/96* (2014.11); *H04N 19/13* (2014.11); *H04N 19/184* (2014.11)

(58) Field of Classification Search
CPC ...... H04N 19/96; H04N 19/13; H04N 19/184; H04N 19/91; H04N 19/147; H04N 19/176; H04N 19/423
USPC .................................................... 375/240.12
See application file for complete search history.

(56) References Cited

U.S. PATENT DOCUMENTS

| | | | |
|---|---|---|---|
| 5,682,152 A | | 10/1997 | Wang et al. |
| 5,850,261 A | * | 12/1998 | Kondo ............... H04N 19/98 375/E7.231 |
| 7,577,305 B2 | | 8/2009 | Srinivasan |
| 8,331,438 B2 | | 12/2012 | Chang et al. |
| 8,803,995 B2 | | 8/2014 | Alvarez et al. |

(Continued)

FOREIGN PATENT DOCUMENTS

JP    2007214813 A  *  8/2007  ............. H04N 19/70

OTHER PUBLICATIONS

An English NPL translation of the Ogikubo reference cited above has been attached along with the original foreign patent document. (Year: 2007).*

*Primary Examiner* — Matthew K Kwan
(74) *Attorney, Agent, or Firm* — F. CHAU & ASSOCIATES, LLC

(57) ABSTRACT

The present disclosure provides an image processing device. The image processing device includes a multimedia processor and a frame buffer compressor. For example, the frame buffer compressor performs a first compression on first image data including at least a most significant bit (MSB) of the image data of the pixel. The frame buffer compressor performs a second compression on second image data including at least a least significant bit (LSB) of the image data of the pixel. According to techniques described herein, a compression type of the first compression (e.g., a compression type based on a constant bit rate (CBR) mode, fixed bit coding, quad-tree coding, etc.) is different from a compression type of the second compression (e.g., a compression type based on a variable bit rate (VBR) mode, Golomb-Rice coding, Huffman coding, etc.).

18 Claims, 16 Drawing Sheets

(56) References Cited

U.S. PATENT DOCUMENTS

| | | | |
|---|---|---|---|
| 8,947,273 B2 | 2/2015 | Bartnik et al. | |
| 9,225,991 B2 | 12/2015 | Tourapis | |
| 10,148,961 B2 | 12/2018 | Zhang et al. | |
| 10,362,313 B2 | 7/2019 | Alshina et al. | |
| 10,726,854 B2 | 7/2020 | Ghido et al. | |
| 2005/0074173 A1* | 4/2005 | Lee | H04N 19/423 375/E7.093 |
| 2007/0009047 A1 | 1/2007 | Shim et al. | |
| 2007/0217704 A1* | 9/2007 | Zeng | H04N 19/91 375/E7.199 |
| 2012/0002715 A1* | 1/2012 | Matsui | G06F 3/1431 375/E7.026 |
| 2018/0084281 A1* | 3/2018 | Hsieh | H04N 19/146 |
| 2018/0084284 A1* | 3/2018 | Rosewarne | H04N 19/119 |
| 2018/0192076 A1 | 7/2018 | Ikai et al. | |

\* cited by examiner

FIG. 14
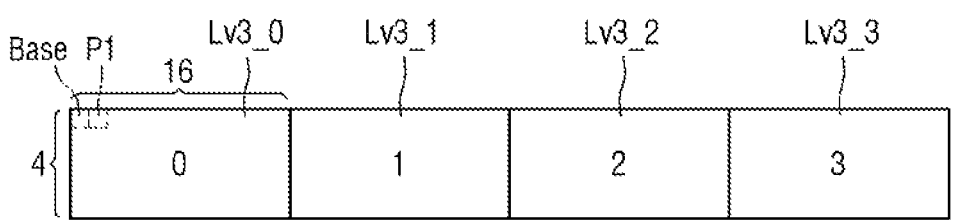
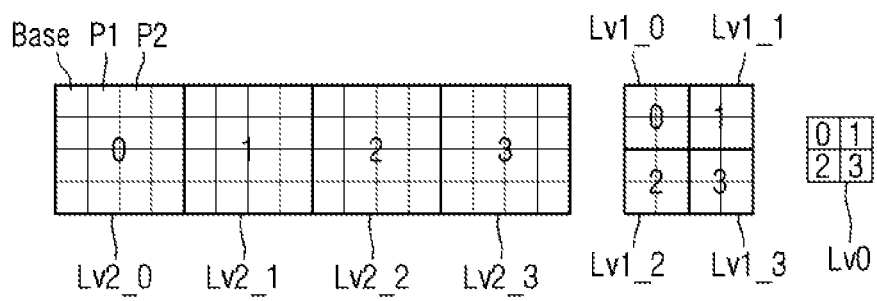

IMAGE PROCESSING DEVICE AND METHOD FOR OPERATING IMAGE PROCESSING DEVICE

This application claims priority from Korean Patent Application No. 10-2020-0181783 filed on Dec. 23, 2020, in the Korean Intellectual Property Office, and all the benefits accruing therefrom under 35 U.S.C. 119, the contents of which are incorporated by reference herein in their entirety.

BACKGROUND

1. Field of the Invention

The present disclosure relates to an image processing device and a method for operating the image processing device.

2. Description of the Related Art

A device (e.g., such as a video device or an imaging display device) may include an image processing system. In some cases, such devices may use image processing systems to process and view high-definition video with a high frame rate. For example, a mobile phone or computer may be used to watch videos, live-streamed television shows, etc. With the increasing demand for high-definition images, high-definition video, and high frame-rate video, the bandwidth needed to view the corresponding image data increases.

As the bandwidth increases due to higher-definition image data, the processing capacity of the image processing system may need to be increased. In some cases where the processing capacity of the image processing system reaches a predetermined limit based on the software and hardware (e.g., some processing capability threshold), problems may arise such as a decrease in device speeds during recording or playback of high-definition and/or high-rate image frames. Decreased speeds adversely impact user experience or may result in more significant problems if the recording or playback occurs during a high-consequence scenario (e.g., such as during video playback in safety applications).

In signal processing, data compression, source coding, or bit-rate reduction is the process of encoding information using fewer bits than the original representation. Data compression has the potential to reduce the transmission bandwidth and reduce storage requirements of devices and corresponding image processing systems. In such cases, data may be compressed before data is written to device memory, and the compressed data may be decompressed before data is read from the memory (e.g., for reducing any data loss during playback of the compressed data). There is an increasing need in the art for efficient compression and decompression techniques.

SUMMARY

Aspects of the present disclosure provide an image processing device that performs optimized decompression of image data. Aspects of the present disclosure also provide a method for operating the image processing device that performs optimized decompression of image data. However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided an image processing device comprising a multimedia processor and a frame buffer compressor. The multimedia processor is configured to process image data of a pixel of an image frame. The frame buffer compressor is configured to perform compression on the image data and generate compressed data. Performing compression on the image data includes performing a first compression on first image data including a most significant bit (MSB) of the image data, and performing a second compression on second image data including a least significant bit (LSB) of the image data, wherein a compression type of the first compression is different from a compression type of the second compression.

According to another aspect of the present disclosure, there is provided an image processing device comprising a multimedia processor and a frame buffer compressor. The multimedia processor is configured to process image data of an image frame. The frame buffer compressor is configured to compress a first block of at least a partial region in the image frame to generate a compressed data stream of the image data, the first block including a first pixel and a second pixel of the image frame. Performing the compression on the image data includes performing a first compression on first image data including a most significant bit (MSB) of image data of the first pixel and second image data including a most significant bit (MSB) of image data of the second pixel to form a first region of the compressed data stream, and performing a second compression on third image data including a least significant bit (LSB) of the image data and fourth image data including a least significant bit (LSB) of the image data of the second pixel to form a second region of the compressed data stream. The frame buffer compressor is further configured to output the first region corresponding to the first image data and the second image data before outputting the second region corresponding to the third image data and the fourth image data.

According to another aspect of the present disclosure, there is provided a method for operation the image processing device, the method comprising processing image data one of a first pixel of an image frame, performing a prediction operation on the image data to generate residual data, performing a first compression on first residual data of the residual data, the first residual data including a most significant bit (MSB) of the image data, performing a second compression on second residual data of the residual data, the second residual data including a least significant bit (LSB) of the image data, wherein a compression type of the first compression is different form a compression type of the second compression, and generating compressed data based on the first compression and the second compression.

BRIEF DESCRIPTION OF THE DRAWINGS

The above and other aspects and features of the present disclosure will become more apparent by describing in detail embodiments thereof with reference to the attached drawings, in which:

FIGS. 13 to 14 are diagrams for explaining the compressed data that is output from the frame buffer compressor according to some embodiments of the present disclosure.

DETAILED DESCRIPTION OF AN EMBODIMENTS

Figure 1:
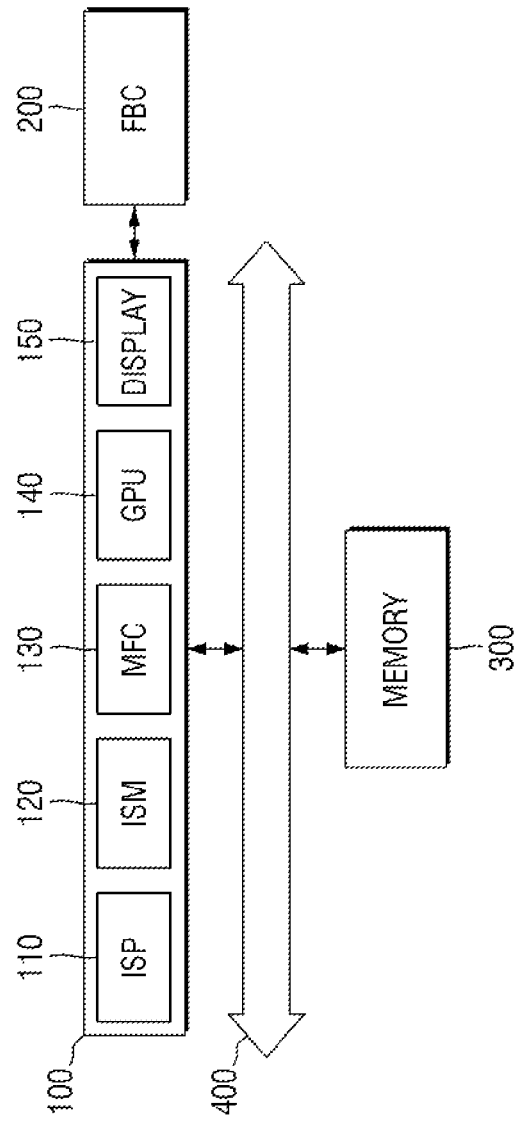
FIGS. 1 to 4 are block diagrams for explaining an image processing device according to some embodiments of the present disclosure.

The present disclosure relates generally to an image processing device. More particularly, embodiments of the present disclosure relate to a compression and decompression method capable of performing compressing different data streams for image data for a single pixel. In some embodiments, the present disclosure compresses most significant bit (MSB) data and least significant bit (LSB) data for image data for one pixel using different compression types.

In signal processing, data compression, source coding, or bit-rate reduction is the process of encoding information using fewer bits than the original representation. Data compression has the potential to reduce the transmission bandwidth and reduce storage requirements of devices and corresponding image processing systems. In such cases, data may be compressed before data is written to device memory, and the compressed data may be decompressed before data is read from the memory (e.g., for reducing any data loss during playback of the compressed data).

High-definition image data and high-frame rate image data increases bandwidth used to extract the data. As bandwidth increases, the processing of a device, such as a mobile phone or computer, may reach a limit set by the hardware in the device. As a result, speed of the image data may decrease to an undesirable level (e.g., in some cases, where the image data is delayed or unviewable).

In some examples, a technique such as variable bit rate (VBR) may be used. However, in some examples, when using VBR methods, the compression data stream (e.g., the size information on the compression data stream) may fluctuate depending on the compressed data, resulting in poor image quality. In some cases, data may be compressed before the data is written to a memory. Then, the compressed data may be decompressed before data is read from the memory.

Accordingly, in some embodiments, the present disclosure may divide image data of a pixel and perform compression on the divided image data to generate compressed data. For example, the frame buffer compressor may perform a first compression on first image data including at least a most significant bit (MSB) of the image data of the pixel. The frame buffer compressor may perform a second compression on second image data including at least a least significant bit (LSB) of the image data of the pixel. According to techniques described herein, a compression type of the first compression may be different from a compression type of the second compression. For example, the first compression on the first image data including the MSB of the pixel image data may be performed based on a constant bit rate (CBR) mode (e.g., based on fixed bit coding, such as quad-tree coding). The second compression on the second image data including the LSB of the pixel image data may be performed based on a variable bit rate (VBR) mode (e.g., based on variable bit coding, such as Golomb-Rice coding, Huffman coding, etc.).

Hereinafter, embodiments according to the technical idea of the present disclosure will be described referring to the accompanying drawings. In the description of FIGS. 1 to 16, the same reference numerals are used for substantially the same components, and repeated descriptions of the components will not be provided. Also, similar reference numerals are used for similar components throughout various drawings of the present disclosure.

FIGS. 1 to 4 are block diagrams for explaining an image processing device according to some embodiments of the present disclosure.

Referring to FIG. 1, the image processing device, according to some embodiments of the present disclosure, includes a multimedia processor 100, a frame buffer compressor (FBC) 200, a memory 300, and a system bus 400.

The multimedia processor 100 may be a part that directly performs the image processing of the image processing device. For example, the multimedia processor 100 may refer to various modules for performing the record and playback of the image, such as camcoding and playback of video image.

The multimedia processor 100 may receive a first data from the outside such as a camera and convert the first data into a second data. In some examples, the first data may be a moving image or an image raw data of an image frame. The second data is data generated by the multimedia processor 100, and may also include data being processed by the multimedia processor 100. For example, the multimedia processor 100 may repeat the process of storing the second data in the memory 300 and updating the second data. The second data may include the data in these steps. However, since the second data may be stored in the form of a third data when stored in the memory 300, the second data may refer to data before being stored in the memory 300 or after being read from memory 300. This will be explained in more detail below.

The multimedia processor 100 may include an image signal processor (ISP) 110, an image stabilization module (ISM) 120, a multi-format codec MFC 130, a GPU 140, and a display 150. However, this embodiment is not limited thereto. For example, the multimedia processor 100 may include at least some of the image signal processor 110, the image stabilization module 120, the multi-format codec 130, the GPU 140, and the display 150 that are described above. For example, the multimedia processor 100 may refer to a processing module that accesses the memory 300 to process the moving images or images.

A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

The image signal processor 110 may receive the first data, preprocess the first data, and convert the first data into the second data. In some examples, the first data may be RGB-type image source data. For example, the image signal processor 110 may convert the RGB type first data into a YUV type second data.

In some examples, the RGB type data refers to a data format in which colors are expressed on the basis of the three primary colors of light. For example, the RGB type data is a type of expressing an image using three kinds of colors such as red, green, and blue. In contrast, the YUV type refers to a data format that separates and expresses brightness, for example, a luminance signal and a chrominance signal. For example, Y refers to a luminance signal, and each of U(Cb) and V(Cr) refers to color difference signals. U refers to a difference between the luminance signal and the blue signal component, and V refers to a difference between the luminance signal and the red signal component.

The YUV type data may be obtained by being converted from the RGB type data, using conversion formulas such as $Y=0.3R+0.59G+0.11B$, $U=(B-Y)\times0.493$, $V=(R-Y)\times0.877$, but the present disclosure is not limited to these conversion formulas.

Because the human eye is sensitive to luminance signals, but is less sensitive to color signals, the YUV type data may be more easily compressed than RGB type data. As a result, the image signal processor 110 may convert the RGB type first data into the YUV type second data. The image signal processor 110 may convert the first data into the second data and then store the second data in the memory 300.

The image stabilization module 120 may perform image stabilization of image and moving image data. The image stabilization module 120 may read the first data or the second data stored in the memory 300 to perform the image stabilization. In some examples, the image stabilization refers to detection of the shaking of the camera from the moving image data and removal thereof.

The image stabilization module 120 may correct the shaking of the first data or the second data, generate or update new second data, and store the generated or updated new second data in the memory 300.

The multi-format codec 130 may be a codec that compresses moving image data. In general, since the moving image data has very large size, a compression module is needed to reduce the size thereof. The moving image data is compressible through associations between the plurality of frames, and this may be performed by the multi-format codec 130. The multi-format codec 130 may read and compress the first data or the second data stored in the memory 300.

The multi-format codec 130 may compress the first data or the second data to generate new second data or update the second data, and store this in the memory 300.

The GPU (Graphics Processing Unit) 140 may calculate and generate 2D or 3D graphics. The GPU 140 may perform arithmetic processing on the first data or the second data stored in the memory 300. The GPU 140 is specialized in processing graphics data and may process graphics data in parallel.

The GPU 140 may compress the first data or the second data to generate new second data or update the second data, and store this in the memory 300.

The display 150 may display the second data stored in the memory 300 on a screen. The display 150 may display an image data processed by another multimedia processor 100, for example, the image signal processor 110, the image stabilization module 120, the multi-format codec 130 and the GPU 140, for example, the second data on the screen. However, an embodiment is not limited thereto.

A display 150 may comprise a conventional monitor, a monitor coupled with an integrated display, an integrated display (e.g., an LCD display), or other means for viewing associated data or processing information. Output devices other than the display 150 can be used, such as printers, other computers or data storage devices, and computer networks.

The image signal processor 110, the image stabilization module 120, the multi-format codec 130, the GPU 140 and the display 150 of the multimedia processor 100 may each operate individually. For example, each of the image signal processor 110, the image stabilization module 120, the multi-format codec 130, the GPU 140 and the display 150 may individually access the memory 300 to write or read the data.

The frame buffer compressor 200 compresses the second data and converts the second data into the third data before the multimedia processor 100 individually accesses the memory 300. The frame buffer compressor 200 may retransmit the third data to the multimedia processor 100 again, and the multimedia processor 100 may transmit the third data to the memory 300.

As a result, the third data compressed by the frame buffer compressor 200 may be stored in the memory 300. Additionally, or alternatively, the third data stored in the memory 300 may be loaded by the multimedia processor 100 and transmitted to the frame buffer compressor 200. The frame buffer compressor 200 may decompress the third data and convert the third data into the second data. The frame buffer compressor 200 may transmit the second data to the multimedia processor 100 again.

For example, each time the image signal processor 110, the image stabilization module 120, the multi-format codec 130, the GPU 140 and the display 150 of the multimedia processor 100 individually access the memory 300, the frame buffer compressor 200 may compress the second data into the third data and transfer the third data to the memory 300. Additionally, or alternatively, each time there are data requests from the memory 300 to the image signal processor 110, the image stabilization module 120, the multi-format codec 130, the GPU 140 and the display 150 of the multimedia processor 100, the frame buffer compressor 200 may decompress the third data into the second data, and transmit the second data to each of the image signal processor 110, the image stabilization module 120, the multi-format codec 130, the GPU 140 and the display 150 of the multimedia processor 100.

The memory 300 may store the third data generated by the frame buffer compressor 200, and provide the stored third data to the frame buffer compressor 200 so that the frame buffer compressor 200 may decompress the third data.

Examples of a memory 300 include random access memory (RAM), read-only memory (ROM), or a hard disk. Examples of memory 300 include solid state memory and a hard disk drive. In some examples, memory 300 is used to store computer-readable, computer-executable software including instructions that, when executed, cause a processor to perform various functions described herein. In some cases, the memory 300 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

The multimedia processor 100 and the memory 300 may each be connected to the system bus 400. The image signal processor 110, the image stabilization module 120, the multi-format codec 130, the GPU 140 and the display 150 of the multimedia processor 100 may be individually connected to the system bus 400. The system bus 400 may become a route through which the image signal processor 110, the image stabilization module 120, the multi-format codec 130, the GPU 140, the display 150, and the memory 300 of the multimedia processor 100 transmit data to each other.

The frame buffer compressor 200 is not connected to the system bus 400, and may perform an operation of converting the second data into the third data and converting the third data into the second data, when each of the image signal processor 110, the image stabilization module 120, the multi-format codec 130, the GPU 140, and the display 150 of the multimedia processor 100 accesses the memory.

Figure 2:
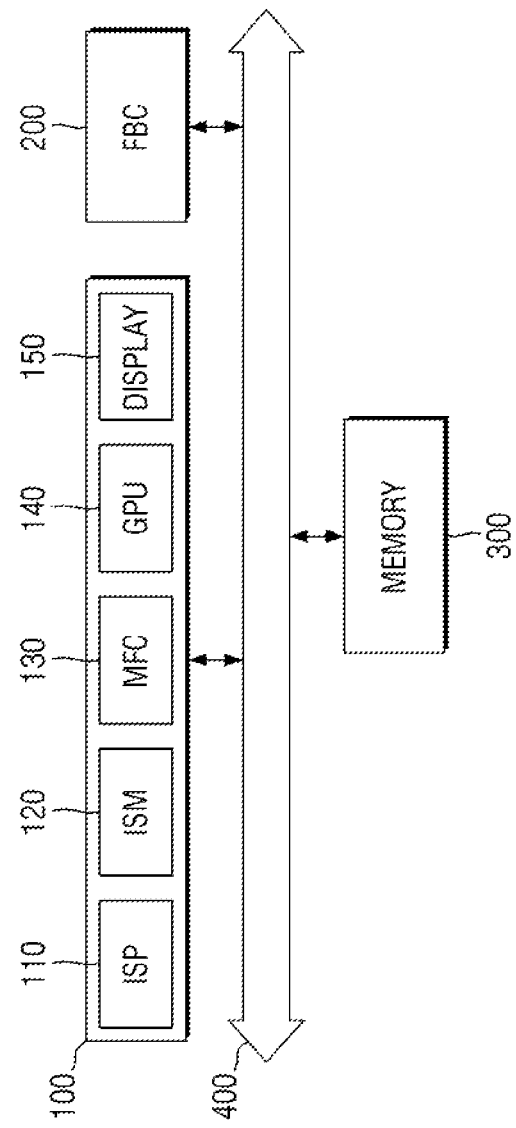

Next, referring to FIG. 2, the frame buffer compressor 200 of the image processing device, according to some embodiments of the present disclosure, may be directly connected to the system bus 400.

The frame buffer compressor 200 is not directly connected to the multimedia processor 100, but may be connected to each other through the system bus 400. Each of the image signal processor 110, the image stabilization module 120, the multi-format codec 130, the GPU 140 and the display 150 of the multimedia processor 100 transmits the data to and from the frame buffer compressor 200 through the system bus 400, and may transmit the data to the memory 300 accordingly.

For example, in the process of compression, the image signal processor 110, the image stabilization module 120, the multi-format codec 130, the GPU 140 and the display 150 of the multimedia processor 100 may each transmit the second data to the frame buffer compressor 200 through the system bus 400. Subsequently, the frame buffer compressor 200 may compress the second data into the third data and transmit the third data to the memory 300 through the system bus 400 again.

Similarly, also in the process of decompression, the frame buffer compressor 200 receives the third data stored in the memory 300 through the system bus 400, and may decompress the third data into the second data. Subsequently, the frame buffer compressor 200 may transmit the second data to each of the image signal processor 110, the image stabilization module 120, the multi-format codec 130, the GPU 140 and the display 150 of the multimedia processor 100 through the system bus 400.

In some examples, a device may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

Figure 3:
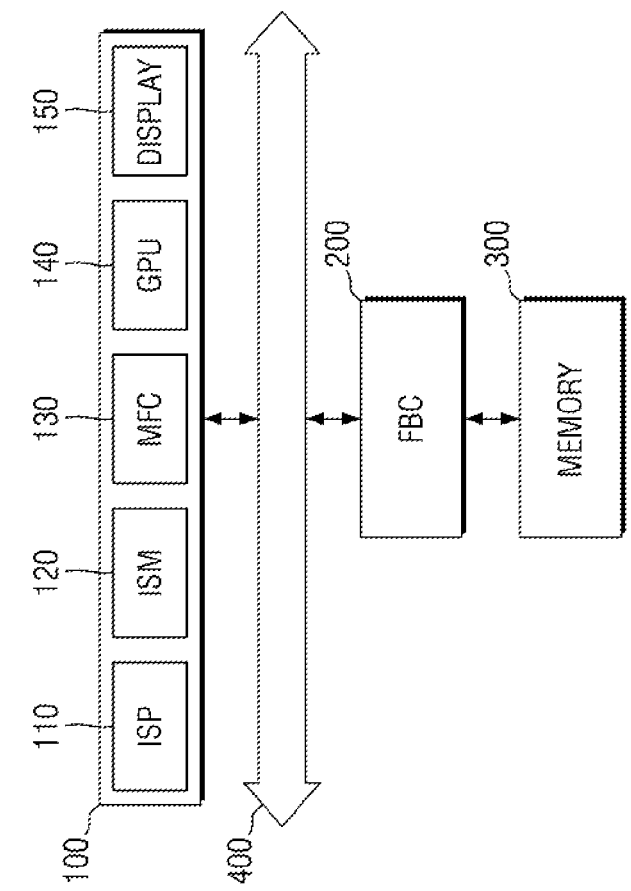

Next, referring to FIG. 3, in the image processing device, according to some embodiments of the present disclosure, the memory 300 and the system bus 400 may be connected to each other through the frame buffer compressor 200.

For example, the memory 300 is not directly connected to the system bus 400, but may be connected to the system bus 400 through the frame buffer compressor 200. Additionally, or alternatively, the image signal processor 110, the image stabilization module 120, the multi-format codec 130, the GPU 140 and the display 150 of the multimedia processor 100 may be directly connected to the system bus 400. Therefore, the image signal processor 110, the image stabilization module 120, the multi-format codec 130, the GPU 140 and the display 150 of the multimedia processor 100 may access the memory 300 by going through the frame buffer compressor 200.

Figure 4:
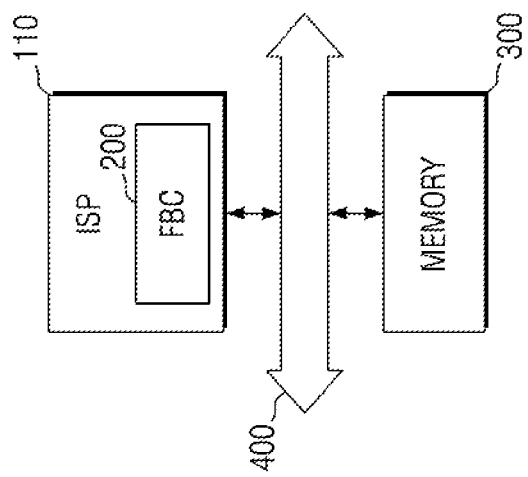

Next, referring to FIG. 4, according to an embodiment, the image signal processor 110 individually includes the frame buffer compressor 200, and may send and receive the third data to and from the memory 300 through the system bus 400.

Although not shown in the drawings, an embodiment of FIG. 4 may also be applied to the image stabilization module 120, the multi-format codec 130, the GPU 140 and the display 150 as well as the image signal processor 110. The second data is also referred to as image data 10, and the third data is also referred to as compressed data 20.

Figure 5:
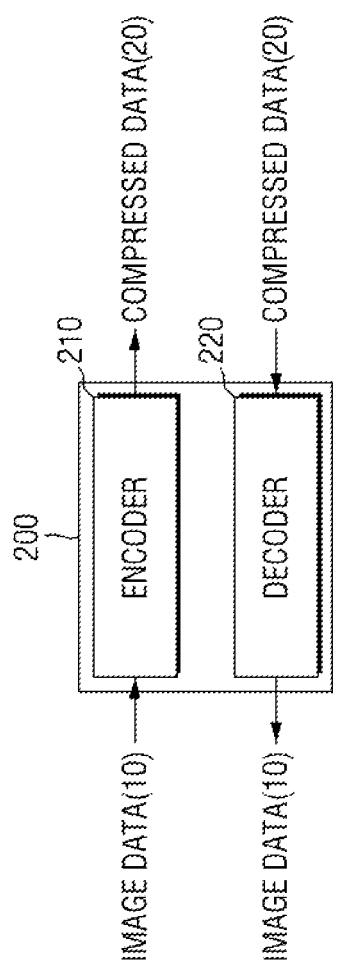
FIG. 5 is a block diagram for explaining a frame buffer compressor of FIGS. 1 to 4 in detail.

FIG. 5 is a block diagram for explaining the frame buffer compressors of FIGS. 1 to 4 in detail. Referring to FIG. 5, the frame buffer compressor 200 may include an encoder 210 and a decoder 220.

The encoder 210 may receive the image data 10 from the multimedia processor 100 and generate the compressed data 20. In some examples, the image data 10 may be transmitted from each of the image signal processor 110, the image stabilization module 120, the multi-format codec 130, the GPU 140 and the display 150 of the multimedia processor 100. The compressed data 20 may be transmitted to the memory 300 through the multimedia processor 100 and the system bus 400.

Additionally, or alternatively, the decoder 220 may decompress the compressed data 20 stored in the memory 300 into the image data 10. The image data 10 may be transferred to the multimedia processor. In some examples, the image data 10 may be transferred to each of the image signal processor 110, the image stabilization module 120, the multi-format codec 130, the GPU 140 and the display 150 of the multimedia processor 100.

Figure 6:
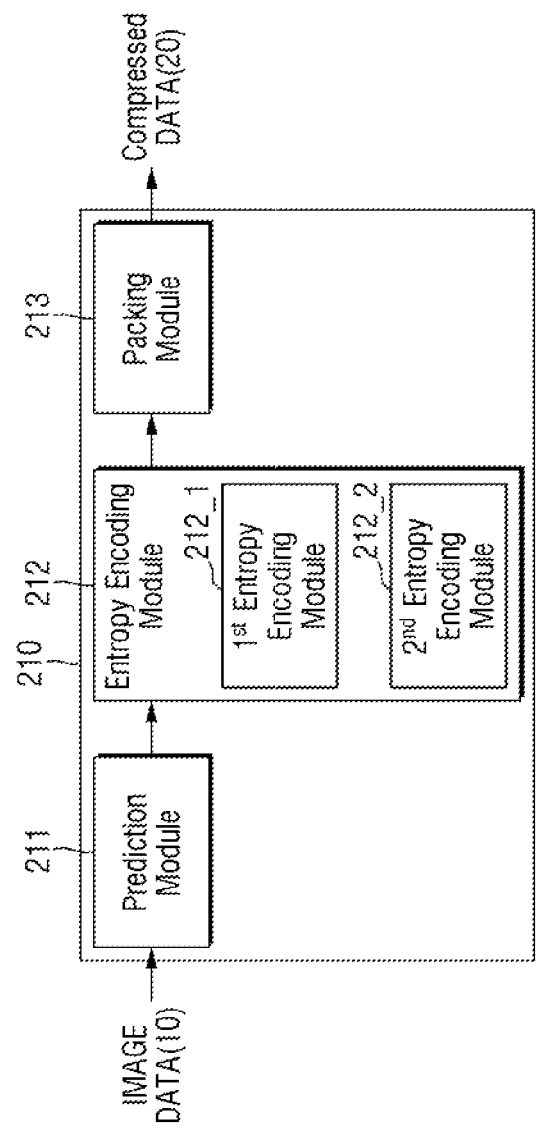
FIG. 6 is a block diagram for explaining an encoder of FIG. 5 in detail.

FIG. 6 is a block diagram for explaining the encoder of FIG. 5 in detail. Referring to FIG. 6, the encoder 210 includes a prediction module 211, an entropy coding module 212, and a packing module 213. The encoder 210 may receive image data 10 indicating one image frame, and according to an embodiment, the image data 10 may be provided to the encoder 210 in pixel units or block units constituting the image frame. In some examples, the block may refer to a region formed by a plurality of adjacent pixels.

The prediction module 211 may perform the prediction operation in pixel units or the prediction operation in block units depending on the image data 10 to be input. The prediction module 211 may convert the image data 10 into residual data (11R, see FIG. 9). The residual data 11R may be expressed dividedly into data of a reference pixel (Base, see FIG. 9) and residual of the pixels (P1 to 4, see FIG. 9) adjacent to the reference pixel (Base). For example, when one pixel has a value of 0 to 255, 8 bits of data per pixel may be used to express this. In contrast, when adjacent pixels have similar values, there is no data loss, even if a difference from the adjacent pixels. For example, the residual may be expressed and a number of data bits to be expressed may be significantly reduced. For example, when the pixel in which the reference pixel (Base) and the first and second pixels P1 and P2 have values of 96, 97, and 98 is continued, if data of the reference pixel (Base) is set to 96, expression of residual data of (96 (Base), 1 (residual) and 1 (residual)) is sufficient, and the number of bits per pixel for expressing such residual data may become very smaller to 2 bits Therefore, the prediction module 211 may dividedly express the residual data 11R into the data of the reference pixel (Base) and the residual of the adjacent pixels P1 to P4, and compress the overall size of the image data 10. Additionally, or alternatively, although the residual data 11R may be generated on the basis of the image data 10 to be input to the prediction module 211 and the prediction data (11P, see FIG. 9) generated from the prediction module 211, various methods are possible as the method for generating the prediction data, depending on an embodiment.

In some aspects, entropy coding may include or refer to a form of lossless (e.g., or a form of reduced loss) data compression. Lossless compression aims to represent discrete data with fewer bits than needed for the original data representation (e.g., without any loss of information, which may improve the effectiveness of decompression techniques).

A bit may refer to a binary digit, a unit (e.g., a smallest possible unit) of information in digital computing. For example, 8 bits may be used to convey a byte of information. Bit rate refers to the number of bits of data transferred (e.g., in a data stream or in a file) over a set length of time. In image processing systems, bit rate may have an effect on image quality, bandwidth consumption, latency, etc.

In some examples, a manner in which data is compressed may be referred to as a compression type (e.g., where a compression type may include a constant bit rate (CBR) compression type, a variable bit rate (VBR) compression type, etc.).

With CBR coding, a fixed bit rate and bandwidth is used (e.g., throughout the compression and encoding of information, such as an image frame, video file, etc.). With constant bit rates, bandwidth consumption may not vary and file size may be limited and predictable. For encoding and compression, this refers to a frame buffer compression data, and an encoder outputting data, at a constant rate. CBR may not be responsive to the complexity or size of data being processed.

With VBR coding, a variable bit rate and bandwidth is used (e.g., throughout the compression and encoding of information, such as an image frame, video file, etc.). With VBR encoding, segments of data may be packaged by their complexity. Compression in VBR makes it possible to process data at a higher bitrate and transmit larger files. For encoding and compression, variable bitrate is measured by taking the average bitrate of the entire file, and data is output at a set rate per time segment.

An entropy encoding module 212 may compress the residual data 11R generated by the prediction module 211 through entropy coding. In some examples, the entropy coding may utilize a method for allocating the number of bits depending on the frequency. The entropy encoding module 212 may include a first entropy encoding module 212_1 and a second entropy encoding module 212_2.

The first entropy encoding module 212_1 may encode and compress a part of the image data 10 of one pixel at a constant bit rate (CBR). The first entropy encoding module 212_1 outputs a fixed number of bits per pixel. The first entropy encoding module 212_1 may perform encoding by a quad-tree coding mode and output a quad-tree code. The quad-tree type encoding will be described below in the description of FIGS. 12 to 14.

The second entropy encoding module 212_2 may encode and compress a part of the image data 10 of one pixel at a variable bit rate VBR. The second entropy encoding module 212_2 outputs the number of bits that are variable for each pixel. The second entropy coding module 212_2 may perform encoding by Golomb-Rice coding, exponential Golomb coding or Huffman coding mode. In some examples, the entropy encoding module 215 may generate an entropy table through a K value, and may easily compress the image data 10.

An entropy table refers to a plurality of code tables identified through the K value to perform an entropy coding algorithm, and the entropy table that may be used in some embodiments of the present disclosure may include at least one of a Golomb-Rice code and an exponential Golomb code. Golomb codes are a set of entropy codes designed for geometrical distributed source. In some examples, if the order of the Golomb code is zero, the Golomb code may be referred to as unary code.

Although not shown, when the encoder 210 operates in a lossy mode according to an embodiment, the quantization module may operate prior to the entropy encoding module 212. The lossy mode may have a relatively high compression rate compared to a lossless mode in which the quantization module does not operate, may have a preset fixed compression rate, and therefore may not separately use information on the compression rate later. However, since a removal operation may be performed on lower bits of the image data 10 in the quantization module, the lower bits may not be restored and may be lost later.

The packing module 213 may pack the compressed image data encoded by each of the first entropy encoding module 212_1 and the second entropy encoding module 212_2, and then perform padding to output the compressed data 20 in the form of a data stream. Here, the padding may refer to an addition of arbitrary (e.g., random, fixed, meaningless, etc.) data to fit the specific size.

After that, the frame buffer compressor 200 may write the generated compressed data 20 to the memory 300. Further, the frame buffer compressor 200 may read the compressed data 20 from the memory 300, decompress the read compressed data 20, and provide read compressed data 20 to the multimedia processor 100.

Figure 7:
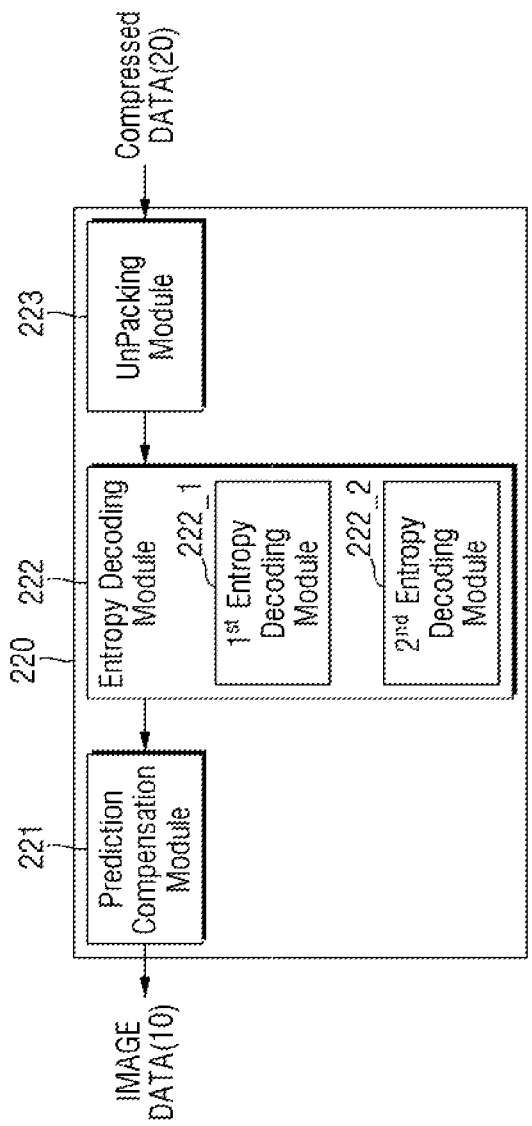
FIG. 7 is a block diagram for explaining a decoder of FIG. 5 in detail.

FIG. 7 is a block diagram for explaining the decoder of FIG. 5 in detail. Referring to FIG. 7, the decoder 220 includes an unpacking module 223, an entropy decoding module 222, and a prediction compensation module 221.

The unpacking module 223 may remove a padded portion of the data padded by the packing module 213 of the encoder 210. After that, the data stream is divided using the size data (20_1a, see FIG. 13) to be described later, and a first stream region (20_1, see FIG. 12) and a second stream region (20_2, see FIG. 12), which are divided data streams may be provided to the entropy decoding module 222.

The entropy decoding module 222 may receive compressed data 20 in the form of a divided data stream. The form of the data stream will be described below in the description of FIGS. 9 to 12. The entropy decoding module 222 may include a first entropy decoding module 222_1 and a second entropy decoding module 222_2.

The first entropy decoding module 222_1 may receive the first stream region 20_1 of the compressed data 20, and decode the first stream region 20_1 through the quad-tree coding mode. When the first stream region 20_1 is input to the entropy decoding module 222, the first stream region 20_1 may include size data including size information of the quad-tree code.

The second entropy decoding module 225 may decompress the second stream region 20_2 of the compressed data 20 through Golomb-Rice coding, exponential Golomb coding or Huffman coding mode. Since the second stream region 20_2 includes a K value, the second entropy decoding module 222_2 may perform a decoding process using the K value.

Although not shown, when the encoder 210 operates in a lossy mode depending on an embodiment, the decoder 220 may include an inverse quantization module that operates after the operation of the entropy decoding module 222. Although the compressed data 20 compressed may be restored using the quantization coefficient defined by the quantization module of the encoder 210, even the part lost in the compression process may not be completely restored.

The prediction compensation module 221 may restore the data expressed as residual data by the prediction module 211. The prediction compensation module 221 may, for example, convert the residual data expression of (96 (Base), 1 (residual), 1 (residual)) into 96, 97, and 98.

The prediction compensation module 221 may restore predictions performed on a pixel basis or a block basis according to the prediction module 211. As a result, the compressed data 20 may be restored or decompressed and transmitted to the multimedia processor 100.

Figure 8:
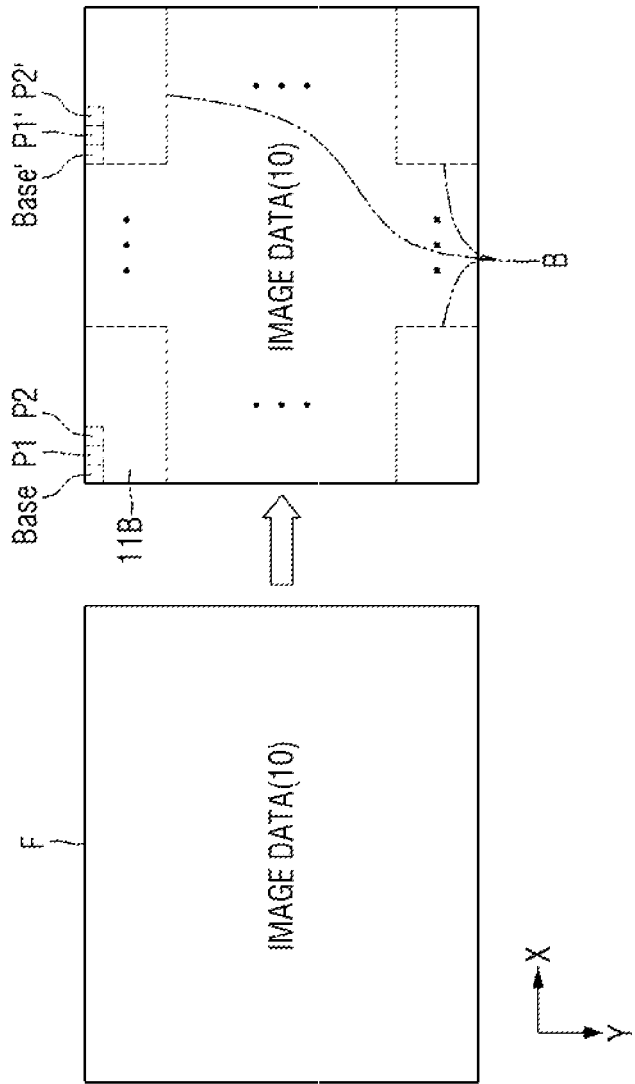
FIGS. 8 to 9 are diagrams for explaining the operation of the image processing device according to some embodiments of the present disclosure.
Figure 9:
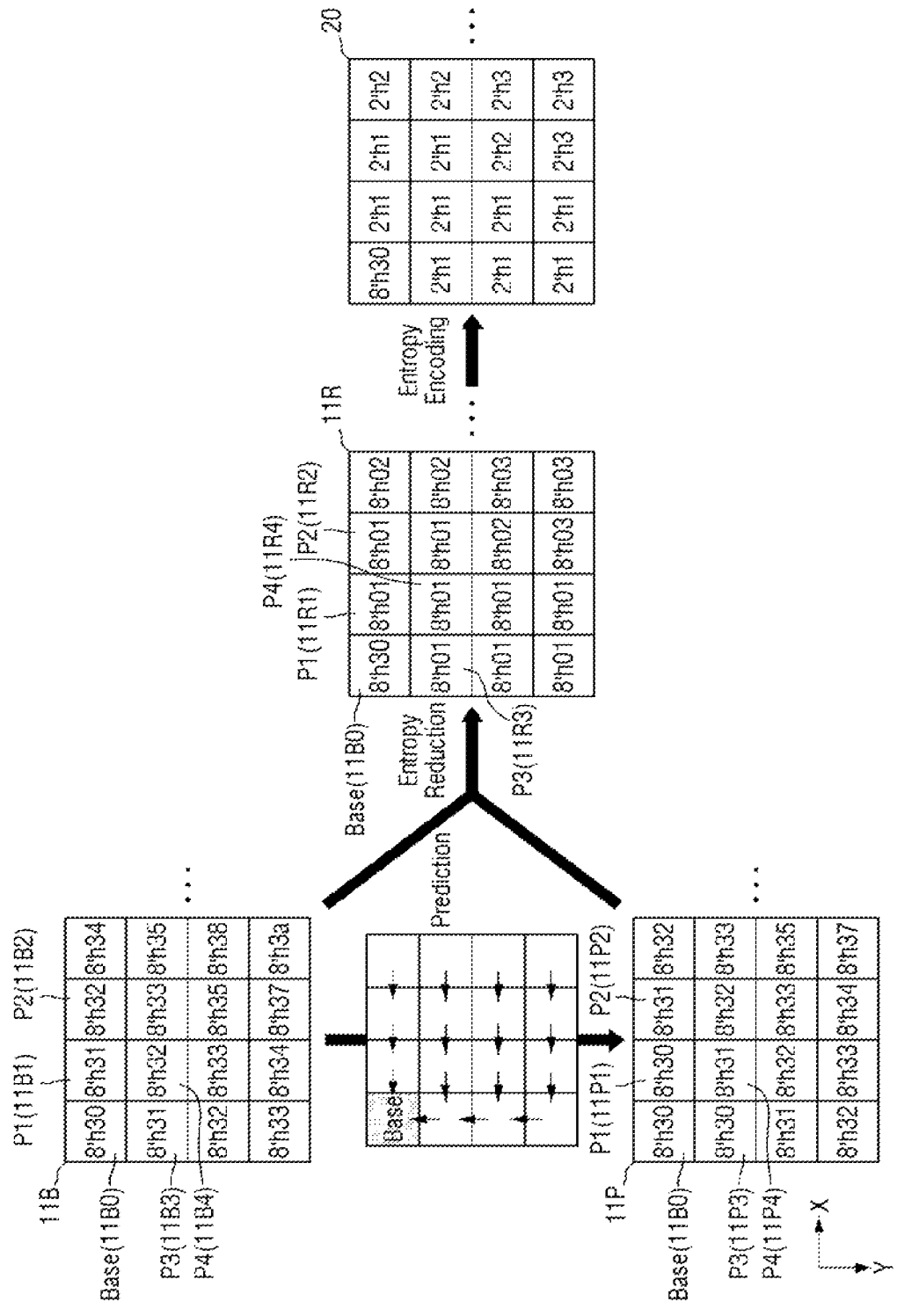

FIGS. 8 to 9 are diagrams for explaining the operation of the image processing device according to some embodiments of the present disclosure.

FIG. 8 is a diagram for explaining the image data 10 that is input to the encoder 210. Referring to FIG. 8, the image data 10 may include data of one image frame F. The image data 10 may include a plurality of block image data 11B, and the plurality of block image data 11B are the image data 10 of each block B constituting the image frame.

The size of each block B may have various examples, including 64×4, 16×4 or 4×4 pixels, and for convenience of explanation, the block image data 11B of the present disclosure may include image data of 64×4 pixels. Each block image data 11B may include image data 10 of a reference pixel (Base, Base') and image data 10 of adjacent pixels P1, P2, P1', and P2'. Each pixel constitutes a image frame. Although the data bits for each pixel may differ depending on an embodiment, for convenience of explanation, the image data 10 of the pixels use 8 bits.

The encoder 210 may perform encoding in units of blocks B to perform a compression operation, and the decoder 220 may also perform decoding in units of image data of a plurality of blocks B to perform a decompression operation.

FIG. 9 is a diagram explaining the operation of the encoder 210. The block image data 11B may include the reference block image data 11B0 of the reference pixel (Base), and the first to fourth block image data 11B1 to 11B4 of the first to fourth pixels P1 to P4.

The reference pixel (Base), the first pixel P1, and the second pixel P2 are placed to extend in a first direction x, the reference pixel (Base) and the third pixel P3 are placed to extend in a second direction y, and the first pixel P1 and the fourth pixel P4 may be placed to extend in the second direction y.

The prediction module 211 may perform a prediction operation on the block image data 11 to form the prediction data 11P, and form a residual data 11R on the basis of the block image data 11B and the prediction data 11P.

As an example, the first prediction data 11P1 of the first pixel P1 may be generated on the basis of the reference pixel (Base), and the first prediction data 11P1 may be the same as the reference block image data 11B0. The second prediction data 11P2 of the second pixel P2 may be generated on the basis of the first pixel P1, and the second prediction data 11P2 may be the same as the first block image data 11B1. The third prediction data 11P3 of the third pixel P3 may be generated on the basis of the reference pixel (Base), and the third prediction data 11P3 may be the same as the reference block image data 11B0. The fourth prediction data 11P4 of the fourth pixel P4 may be generated on the basis of the third pixel P3, and the fourth prediction data 11P4 may be the same as the third block image data 11B3 of the third pixel P3.

For the pixels other than the reference pixel (Base), by subtracting the block image data 11B from the prediction data 11P generated by the prediction operation, the residual data 11R may be generated. As an example, the first residual data 11R1 of the first pixel P1 is 1 (residual), the second residual data 11R2 of the second pixel P2 is 1 (residual), the third residual data 11R3 of the third pixel P3 is 1 (residual), and the fourth residual data 11R4 of the fourth pixel P4 is 1 (residual), and 3 (residual) of the residual data 11R of another pixel may be included in the block. Since the residual data 11R of each pixel is before performing the encoding, 8 bits are used, and upper data including a most significant bit (MSB) in the residual data 11R of another pixel other than the reference pixel (Base) corresponds to zero data.

The prediction operation for forming the residual data 11R may be implemented in various manners by changing the number and arrangement of reference pixels (Base) according to an embodiment, the prediction operation described in FIG. 9 is an example, and the present disclosure is not limited to the prediction operation of FIG. 9.

The entropy encoding module 212 may perform the compression operation of encoding the residual data 11R of pixel in the block other than the reference pixel (Base), using the first entropy encoding module 212_1 and the second entropy encoding module 212_2 to generate the compressed data 20.

Figure 10:
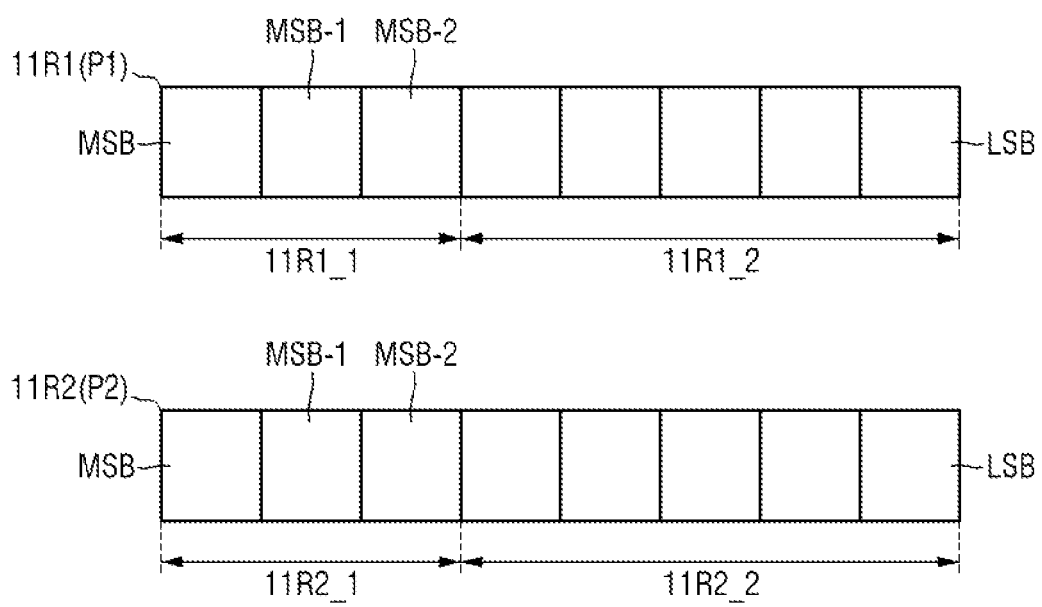
FIG. 10 is a schematic diagram for explaining the operation of the image processing device according to some embodiments of the present disclosure.

FIG. 10 is a schematic diagram for explaining the operation of the image processing device according to some embodiments of the present disclosure. FIG. 10 is a diagram showing the layout of the first residual data 11R1 and the second residual data 11R2 of the first pixel P1 and the second pixel P2 in the block.

The first residual data 11R1 and the second residual data 11R2 may be 8 bits. The first residual data 11R1 may include a first_1 residual data 11R1_1 and a first_2 residual data 11R1_2. The second residual data 11R2 may include a secondi residual data 11R2_1 and a second_2 residual data 11R2_2.

The least significant bit (LSB) (e.g., in computing operations) may include or refer to the bit position in a binary integer (e.g., in a data stream) giving the units value. For example, the LSB may determine whether the number is even or odd. The LSB is sometimes referred to as the right-most bit or the low-order bit. The most significant bit (MSB) may include or refer to the bit position in a binary number (e.g., in a data stream) having the greatest value. The MSB is sometimes referred to as the left-most bit due to the convention in positional notation of writing more significant digits further to the left. In some cases, the MSB may be referred to as the high-order bit.

The first_1 residual data 11R1_1 may include the most significant bit (MSB) of the first residual data 11R1, and the MSB−1 bit and MSB−2 bit placed subsequent to the most significant bit, and may be an upper data of the first residual data 11R1. The first_1 residual data 11R1_1 may correspond to a first_1 image data (not shown) including the most significant bit, the MSB−1 bit, and the MSB−2 bit that are continuous in the first block image data 11B1.

The first entropy encoding module 212_1 may perform quad-tree coding, which is a fixed bit rate coding type, on the first_1 residual data 11R1_1 to perform the compression operation.

The first_2 residual data 11R1_2 may include remaining bits other than the bits MSB, MSB−1, and MSB−2 included in the first_1 residual data 11R1_1 in the first residual data 11R1, and may be referred to as a lower data of the first residual data 11R1. The first_2 residual data 11R1_2 may correspond to first_2 image data (not shown) including the remaining bits other than the most significant bit, the MSB−1 bit, and the MSB−2 bit that are continuous in the first block image data 11B1.

The second entropy coding module 212_2 may perform a variable bit rate coding mode on the first_2 residual data 11R1_2 to perform the compression operation. The variable bit rate encoding may include Golomb-Rice coding, exponential Golomb coding or Huffman coding. Therefore, the entropy coding module 212 performs the variable bit rate coding mode on lower 5 bits among the 8 bits of the first residual data 11R1.

The encoding of the first residual data 11R1 described above may also correspond to encoding of the residual data 11R of remaining pixels in the block B including the second pixel P2 to the fourth pixel P4 in the block, and the description of the encoding of the first residual data 11R1 of the first pixel P1 replaces the description of the encoding of the residual data 11R of the remaining pixels.

Figure 11:
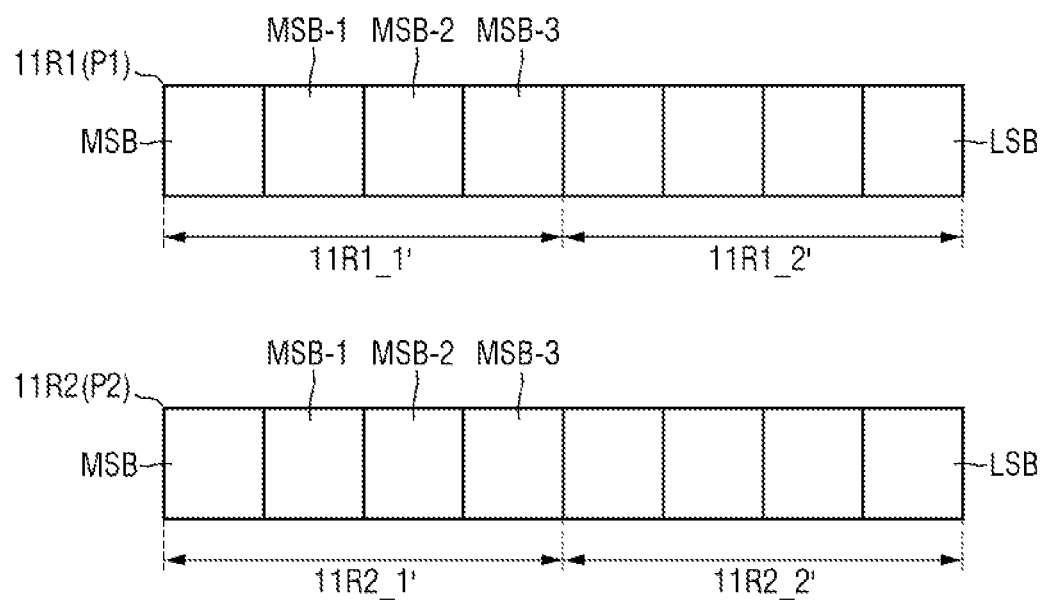
FIG. 11 is a schematic diagram for explaining the operation of the image processing device according to some other embodiments of the present disclosure.

FIG. 11 is a schematic diagram for explaining the operation of the image processing device according to some other embodiments of the present disclosure. Hereinafter, the operation of the image processing device according to some other embodiments of the present disclosure will be described referring to FIG. 11. Differences from the operation of the image processing device shown in FIG. 10 will be mainly described.

When compared with the first_1 residual data 11R1_1 of FIG. 10, a first_1 residual data 11R1_1' may include a most significant bit MSB of the first residual data 11R1, and MSB−1 bit, MSB−2 bit and MSB−3 bit placed subsequent to the most significant bit MSB.

When compared with the first_2 residual data 11R1_2 of FIG. 10, the first_2 residual data 11R1_2' may include remaining bits other than the bits MSB, MSB−1, MSB−2, and MSB−3 included in the first_1 residual data 11R1_1' in the first residual data 11R1. Therefore, the entropy coding module 212 performs the variable bit rate coding mode on the lower 4 bits among 8 bits of the first residual data 11R1.

Figure 12:
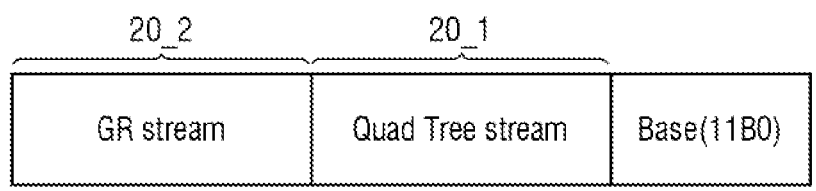
FIG. 12 is a diagram for explaining compressed data that is output from the frame buffer compressor according to some embodiments of the present disclosure.

FIG. 12 is a diagram for explaining compressed data that is output from the frame buffer compressor according to some embodiments of the present disclosure. Referring to FIG. 12, the encoder 210 may perform a compression operation on the block image data 11B to output a compressed data 20 of the data stream type. The compressed data 20 may include a reference block image data 11B0, a first stream region 20_1, and a second stream region 20_2.

The encoder 210 may output the compressed data 20 in the order of the reference block image data 11B0, the first stream region 20_1, and the second stream region 20_2. Additionally, or alternatively, the decoder 220 may receive input of the compressed data 20 in the order of the reference block image data 11B0, the first stream region 20_1, and the second stream region 20_2.

The reference block image data 11B0 may correspond to the reference block image data 11B0 of FIG. 9. A specific description of the first stream region 20_1 and the second stream region 20_2 will be provided below in the description of FIGS. 13 to 14.

Figure 13:
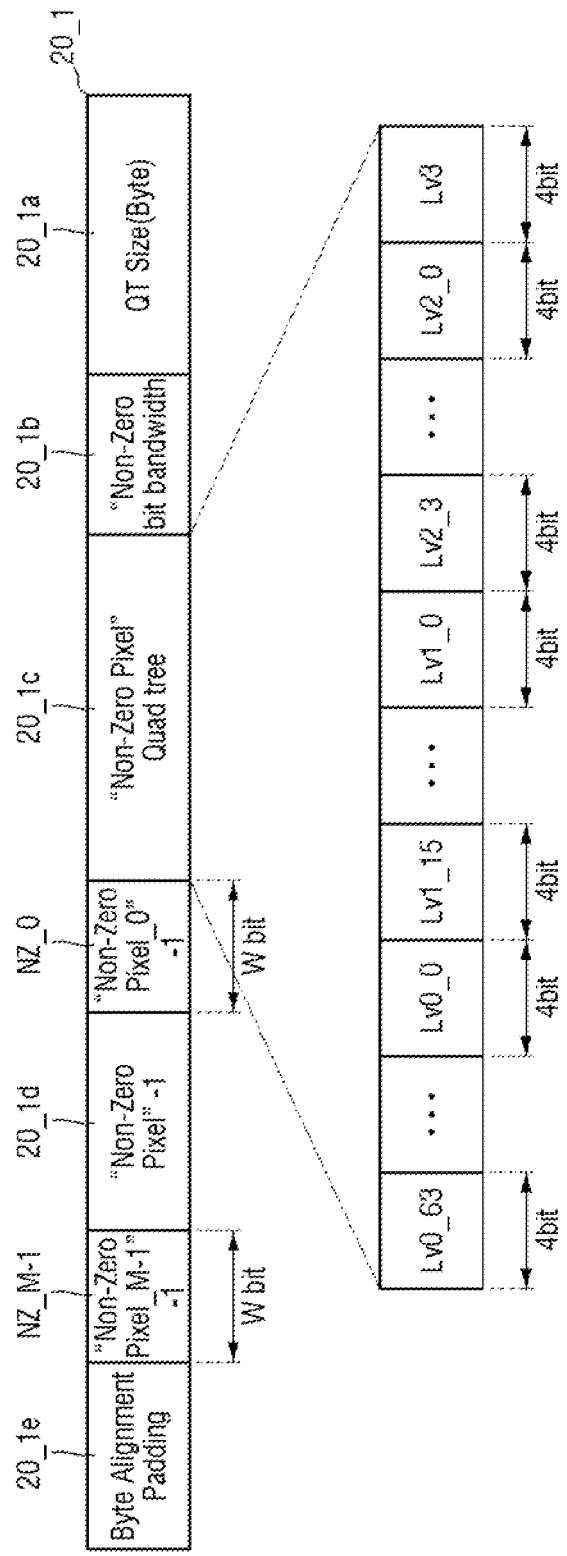

FIGS. 13 to 14 are diagrams for explaining the compressed data that is output from the frame buffer compressor according to some embodiments of the present disclosure. The first stream region 20_1 may include a size data 20_1a, a bit bandwidth data 20_1b, a quad-tree data 20_1c, a non-zero pixel data 20_1d, and a byte alignment padding bit 20_1e.

The first stream region 20_1 is a region in which a quad-tree code generated when the first entropy encoding module 212_1 encodes the first_1 residual data 11R1_1 and the secondi residual data 11R2_1 of FIG. 10 by a quad-tree coding mode is stored, and is a region decoded by the first entropy decoding module 222_1.

The quad-tree code is a code that stores the non-zero pixels other than the pixels for storing zero data, and the data values stored in the non-zero pixels, and in which the compression efficiency increases as raw data includes more zero data.

The size data 20_1a is data indicating the size (Byte) information of the first stream region 20_1, and the size data 20_1a uses 4 bits or 5 bits of the size (Byte) information of the first stream region 20_1 according to an embodiment. The byte alignment padding bit 20_1e is a padding bit for generating the size of the first stream region 20_1 in byte units, and may be 0 bits to 7 bits according to an embodiment.

Since the size information of the first stream region 20_1 may be determined through the size data 20_1a and the byte alignment padding bit 20_1e, and the unpacking module 223 may confirm the position information of the second stream region 20_2 in the compressed data 20 through the size data 20_1a and the byte alignment padding bit 20_1e, the decompression operation may be performed at the same time as the decompression operation of the first entropy decoding module 222_1.

Since the bit bandwidth data 20_1b indicates the bit bandwidth W of the non-zero pixel data 20_1d, and the size of bit bandwidth W of the non-zero pixel data 20_1d is affected by the bit bandwidth size of the first_1 residual data 11R1_1 and the second_1 residual data 11R2_1 of FIG. 10, the bit bandwidth data 20_1b may also be affected by the bit bandwidth size of the first_1 residual data 11R1_1 and the second_1 residual data 11R2_1.

The quad-tree data 20_1c may indicate the position information of non-zero pixel that stores non-zero data in the upper data of the residual data 11R through level 3 mask data Lv3, level 2 mask data Lv2_0 to Lv2_3, level 1 mask data Lv1_1 to Lv1_15, and level 0 mask data Lv0_1 to Lv0_64.

For example, when the first_1 residual data 11R1_1 of the first pixel in the block B is the non-zero pixel, in the quad-tree data 20_1c, the level 3 mask data Lv3 may indicate 4'b0001, level 2_0 mask data Lv2_0 may indicate 4'b0001, level 1_0 mask data Lv2_0 may indicate 4'b0001, and level 0_0 mask data Lv2_0 may indicate 4'b0010. For example, when the non-zero pixels are not placed on the upper bits of the residual data 11R in the block B, in the quad-tree data 20_1c, level 3 mask data Lv3 indicates 4'b0000, and level 2 mask data Lv2_0 to Lv2_3, level 1 mask data Lv1_1 to Lv1_15, and level 0 mask data Lv0_1 to Lv0_64 are not included.

The non-zero pixel data 20_1d may include a $0^{th}$ non-zero pixel data NZ_0 to an $M^{th}-1$ non-zero pixel data NZ_M-1. M may be changed depending on the size of the block B and the position information indicated by the quad-tree data 20_1c, and when the size of the block B is 64×4 pixels, the maximum value of M is 256.

Data of the non-zero pixel may be stored according to the position information indicated by the quad-tree data 20_1c. Since the non-zero pixel data 20_1d is assumed to be non-zero, the non-zero pixel data 20_1d may be stored to be bias by −1 on the basis of the upper data of the residual data 11R. Since the size of bit bandwidth W of the non-zero pixel data 20_1d may be reduced through the storage due to the bias, the bandwidth of compressed data 20 may be reduced.

Figure 15:
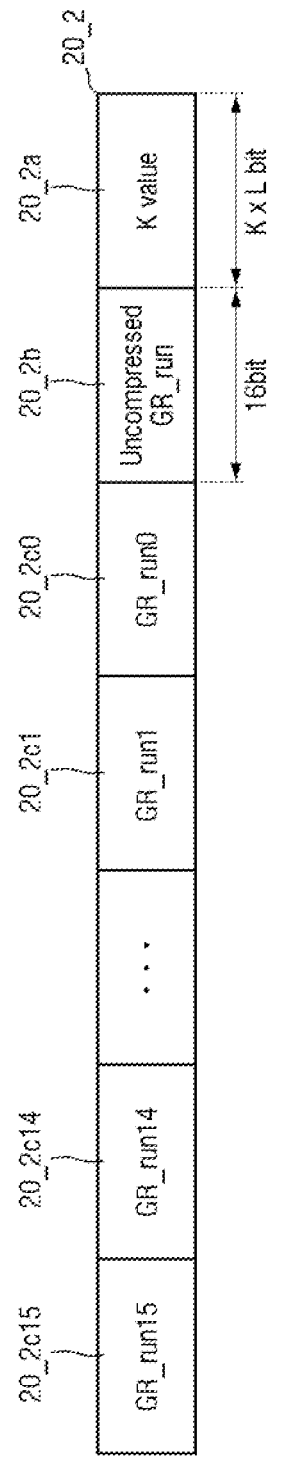
FIGS. 15 to 16 are diagrams for explaining the compressed data that is output from the frame buffer compressor according to some embodiments of the present disclosure.
Figure 16:
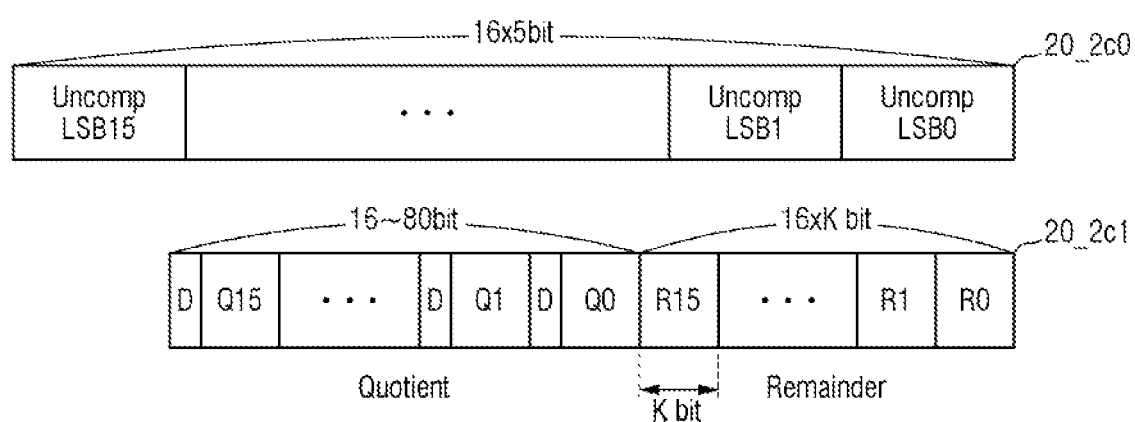

FIGS. 15 to 16 are diagrams for explaining the compressed data that is output from the frame buffer compressor according to some embodiments of the present disclosure.

Referring to FIGS. 15 and 16, the second stream region 20_1 is a region in which Golomb-Rice code generated when the second entropy encoding module 212_2 encodes the first_2 residual data 11R1_2 and the second_2 residual data 11R2_2 of FIG. 10 by a Golomb-Rice coding mode is stored, and the second stream region 20_1 is a region decoded by the second entropy decoding module 222_2.

The second stream region 20_1 may include K value data 20_2a, uncompressed Golomb run data 20_2b, and $0^{th}$ to fifteenth Golomb runs 20_2c0 to 20_2c15.

The K value data 20_2a may include K-value information of Golomb-Rice coding on the second stream region 20_1, and L K-values may be included according to an embodiments, and the K value data 20_2a may use K×L bits.

The uncompressed Golomb run data 20_2b may indicate information on the uncompressed Golomb run of the $0^{th}$ to fifteenth Golomb runs 20_2c0 to 20_2c15. Therefore, the uncompressed Golomb run data 20_2b may use 16 bits.

Each Golomb run 20_2c may store data of lower data of the residual data 11R of 4×4 pixel. Since the Golomb run 20_2c indicates the data of Golomb-Rice code, which is a variable bit rate mode, when encoding is performed on the lower data (5 bits) in the residual data of 4×4 pixel size by Golomb-Rice encoding mode, the number of bits larger than 5×16 bits may be used. Therefore, the compression operation may not be performed according to each Golomb run 20_2c.

Assuming that the second entropy coding module 212_2 does not perform the compression operation on the $0^{th}$ Golomb run 20_2c0 and performs the compression operation on the first Golomb run 20_2c1, the $0^{th}$ Golomb run 20_2c0 includes the $0^{th}$ to fifteenth uncompressed lower data Uncomp LSB0 to Uncomp LSB15, and the $0^{th}$ golomb run 20_2c0 may use 80 bits.

The first golomb run 20_2c1 may include $0^{th}$ to fifteenth quotient data Q0 to Q15, separator D, and $0^{th}$ to fifteenth residual data R0 to R15. The $0^{th}$ to fifteenth quotient data Q0 to Q15 and the separator D use 16 bits to 80 bits, and the $0^{th}$ to fifteenth residual data R0 to R15 may include 16×K bits.

According to the present disclosure, by encoding an image such as YUV image data in which a large gap may occur between pixels, using both a variable bit rate mode and a fixed bit rate mode, it is possible to have a high compression ratio. Further, in the implementation of the variable bit rate mode, by performing the compression on a part of the image data by the variable bit rate mode, and the load of compression can be reduced.

For example, when the residual data indicates 8'b11111111 and the K value is 2, the golomb-rice code of the residual data uses 66 bits. When performing the golomb-rice coding on 5'b11111, which is a lower data of the residual data as in the present disclosure, since the golomb-rice code of the lower data uses 10 bits, the load of compression can be reduced.

Example embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An image processing device comprising:
   a multimedia processor configured to process image data of a pixel of an image frame, wherein the image data comprises first image data and second image data, the first image data comprising a plurality of bits for the pixel including a most significant bit (MSB) of the image data and the second image data comprising a plurality of bits for the pixel including a least significant bit (LSB) of the image data; and
   a frame buffer compressor configured to perform compression on the image data of the pixel using a first compression and a second compression, wherein performing the compression on the image data comprises:
      performing a prediction operation on the image data of the pixel to form first residual data corresponding to the first image data and second residual data corresponding to the second image data;
      performing the first compression on the plurality of bits of the first image data of the pixel including the MSB of the image data based on the first residual data, and performing the second compression on the plurality of bits of the second image data of the pixel including the LSB of the image data based on the second residual data, wherein a compression type of the first compression is different from a compression type of the second compression.

2. The image processing device of claim 1, wherein the second image data is compressed to a variable bit rate (VBR) based on performing the second compression.

3. The image processing device of claim 2, wherein the second image data is compressed into a Golomb-Rice code based on performing the second compression.

4. The image processing device of claim 1, wherein the first image data is compressed to a constant bit rate (CBR) based on performing the first compression.

5. The image processing device of claim 4, wherein the first image data is compressed to a quad-tree code based on performing the first compression.

6. The image processing device of claim 1, wherein the frame buffer compressor comprises:
   a first encoding module configured to perform the first compression on the first image data; and
   a second encoding module configured to perform the second compression on the second image data.

7. The image processing device of claim 1, wherein the frame buffer compressor is configured to:
   form a compressed data stream based on the compression performed on the image data,
   form a first region of the compressed data stream based on the first compression performed on the first image data,
   form a second region of the compressed data stream based on the second compression performed on the second image data, and
   output the first region before the second region.

8. The image processing device of claim 7, wherein the first region comprises size data including size information corresponding to the first region.

9. The image processing device of claim 1, wherein the first image data comprises the MSB, a second MSB (MSB-1), and a third MSB (MSB-2) bit of the image data.

10. An image processing device comprising:
    a multimedia processor configured to process image data of an image frame, wherein the image data comprises first image data, second image data, third image data, and fourth image data, the first image data comprising a plurality of bits including a most significant bit (MSB) of the image data for a first pixel, the second image data comprising a plurality of bits including an MSB of the image data for a second pixel, the third image data comprising a plurality of bits including a least significant bit (LSB) of the image data for the first pixel, and the fourth image data comprising a plurality of bits including an LSB of the image data for the second pixel; and
    a frame buffer compressor configured to compress a first block of at least a partial region in the image frame to generate a compressed data stream of the image data, the first block comprising the first pixel and the second pixel of the image frame,
    wherein performing the compression on the image data comprises:
      performing a prediction operation on the image data to form residual data including first residual data corresponding to the first image data, second residual data corresponding to the second image data, third residual data corresponding to the third image data, and fourth residual data corresponding to the fourth image data;
      performing a first compression on the plurality of bits of the first image data including the MSB of the image data for the first pixel based on the first residual data and performing the first compression on the plurality of bits of the second image data including the MSB of the image data for the second pixel based on the second residual data to form a first region of the compressed data stream;
      performing a second compression on the plurality of bits of the third image data including the LSB of image data for the first pixel based on the third residual data and performing the second compression on the plurality of bits of the fourth image data including the LSB of the image data for the second pixel based on the fourth residual data wherein a compression type of the second compression is different from a compression type of the first compression; and
      outputting the first region of the compressed data stream corresponding to the first image data and the second image data before outputting the second region of the compressed data stream corresponding to the third image data and the fourth image data.

11. The image processing device of claim 10, wherein a compression type of the first compression is different from a compression type of the second compression.

12. The image processing device of claim 11, wherein:
    the first image data and the second image data are compressed into a Quad-Tree code based on performing the first compression, and
    the third image data and the fourth image data are compressed into a Golomb-Rice code based on performing the second compression.

13. The image processing device of claim 10, wherein the first region comprises size data including size information corresponding to the first region.

14. The image processing device of claim 13, wherein the frame buffer compressor is configured to perform decompression on the first region and decompression on the second region at the same time.

15. The image processing device of claim 10, wherein the prediction operation of the second image data is performed on the basis of the first image data.

16. A method for operating an image processing device, the method comprising:
    processing image data of a pixel of an image frame, wherein the image data comprises first image data and second image data, the first image data comprising a plurality of bits for the pixel including a most significant bit (MSB) of the image data and the second image data comprising a plurality of bits for the pixel including a least significant bit (LSB) of the image data;
    performing a prediction operation on the image data to generate residual data including first residual data and second residual data;
    performing a first compression on the first residual data of the residual data, the first residual data corresponding to the plurality of bits of the first image data including the MSB of the image data;
    performing a second compression on the second residual data of the residual data, the second residual data corresponding to the plurality of bits of the second image data including the LSB of the image data, wherein a compression type of the first compression is different from a compression type of the second compression; and
    generating compressed data based on the first compression and the second compression.

17. The method for operating the image processing device of claim 16, further comprising:
    performing the first compression on the first residual data to generate a quad-tree code;
    performing the second compression on the second residual data to generate a Golomb-Rice code; and
    generating the compressed data based on the quad-tree code and the Golomb-Rice code.

18. The method for operating the image processing device of claim 16, further comprising:

forming a compressed data stream based on the compressed data;
performing the first compression on the first residual data to form a first region of the compressed data stream;
performing the second compression on the second residual data to form a second region of the compressed data stream; and
outputting the first region before outputting the second region.

* * * * *